(12) United States Patent
Shao et al.

(10) Patent No.: US 11,868,116 B2
(45) Date of Patent: Jan. 9, 2024

(54) METHODS AND INTERNET OF THINGS FOR REGULATING GAS IN-HOME PRESSURES BASED ON SMART GAS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yaqiang Quan, Chengdu (CN); Bin Liu, Chengdu (CN); Lei Zhang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/300,360

(22) Filed: Apr. 13, 2023

(65) Prior Publication Data
US 2023/0251634 A1 Aug. 10, 2023

(30) Foreign Application Priority Data
Feb. 13, 2023 (CN) .......................... 202310104415.2

(51) Int. Cl.
*G05B 19/416* (2006.01)
(52) U.S. Cl.
CPC .. *G05B 19/416* (2013.01); *G05B 2219/41108* (2013.01)
(58) Field of Classification Search
CPC ........ G05B 19/416; G05B 2219/41108; Y02P 90/02
(Continued)

(56) References Cited

U.S. PATENT DOCUMENTS

| 5,427,143 A | 6/1995 | Maracchi |
| 8,548,757 B1 | 10/2013 | Foley |

(Continued)

FOREIGN PATENT DOCUMENTS

| CN | 1521449 A | 8/2004 |
| CN | 205480199 U | 6/2016 |

(Continued)

OTHER PUBLICATIONS

Yang, Zhiliang, Analysis of Additional Pressure and Pressure Regulation Method for Gas Pipeline of Super High-rise Residential Buildings, Fujian Architecture & Construction, 101-104, 2020.
(Continued)

*Primary Examiner* — Thomas C Lee
*Assistant Examiner* — Michael Tang
(74) *Attorney, Agent, or Firm* — METIS IP LLC

(57) ABSTRACT

The present disclosure provides a method and an Internet of Things system for regulating a gas in-home pressure based on smart gas. The method includes: determining a gas in-home pressure regulation scheme, and the gas in-home pressure regulation scheme including a pressure regulation parameter of a gas device; generating, based on the gas in-home pressure regulation scheme, a pressure regulation instruction; regulating, based on the pressure regulation instruction, a gas in-home pressure of at least one floor; and transmitting the gas in-home pressure regulation scheme to a smart gas user terminal.

6 Claims, 8 Drawing Sheets

(58) Field of Classification Search
USPC .............................................. 700/28; 137/505
See application file for complete search history.

(56) References Cited

U.S. PATENT DOCUMENTS

| | | | | |
|---|---|---|---|---|
| 2013/0333356 | A1* | 12/2013 | Kuroki | .................... F02B 47/10 |
| | | | | 60/278 |
| 2016/0004260 | A1 | 1/2016 | Peace | |
| 2018/0231184 | A1 | 8/2018 | Won et al. | |
| 2023/0027479 | A1 | 1/2023 | Shao et al. | |

FOREIGN PATENT DOCUMENTS

| | | | | | |
|---|---|---|---|---|---|
| CN | 109373191 | A | | 2/2019 | |
| CN | 110191180 | A | | 8/2019 | |
| CN | 111503523 | A | | 8/2020 | |
| CN | 109373191 | B | * | 10/2020 | ............... F17D 1/02 |
| CN | 112068456 | A | * | 12/2020 | ............. G05B 17/02 |
| CN | 112068456 | A | | 12/2020 | |
| CN | 113011847 | A | | 6/2021 | |
| CN | 217030831 | U | | 7/2022 | |
| CN | 115355447 | A | | 11/2022 | |
| CN | 115511665 | A | | 12/2022 | |
| GE | U1997319 | Y | | 11/1997 | |
| JP | 2004065763 | A | | 3/2004 | |
| JP | 2004213336 | A | | 7/2004 | |
| JP | 2009192397 | A | | 8/2009 | |
| KR | 20140039107 | A | | 4/2014 | |
| KR | 20190064048 | A | | 6/2019 | |
| WO | 2010070283 | A1 | | 6/2010 | |

OTHER PUBLICATIONS

Deng, Yong, Additional Pressure Solutions for Natural Gas in High-Rise Residential Buildings, Gas & Heat, 2020, 7 pages.

Zhang, Haoqing et al., Predictive Control Strategies for Gas Regulating Systems in Residential Communities, Electronic Technology & Software Engineering, 2020, 5 pages.

Notification to Grant Patent Right for Invention in Chinese Application No. 202310104415.2 dated Apr. 14, 2023, 5 pages.

First Office Action in Chinese Application No. 202310104415.2 dated Mar. 24, 2023, 15 pages.

* cited by examiner

METHODS AND INTERNET OF THINGS FOR REGULATING GAS IN-HOME PRESSURES BASED ON SMART GAS

CROSS-REFERENCE TO RELATED APPLICATIONS

This application claims priority of Chinese Patent Application No. 202310104415.2, filed on Feb. 13, 2023, the contents of which are hereby incorporated by reference to its entirety.

TECHNICAL FIELD

The present disclosure relates to the field of gas pressure regulation, and in particular, to a method and an Internet of Things system for regulating a gas in-home pressure based on smart gas.

BACKGROUND

The density of natural gas is less than that of air, and when the transmission height of natural gas reaches a certain range, it generates a larger additional pressure on the transmission pipeline. The higher the height is, the larger the additional pressure is, so it may generate a larger pressure burden on the gas pipeline on higher floors, causing a certain hidden danger to the gas safety of gas users.

Therefore, it is desired to propose a method for regulating a gas in-home pressure to reasonably regulate the gas pressure in the gas mains of a building so that the gas in-home pressure on each floor is maintained within a safe range.

SUMMARY

One or more embodiments of the present disclosure provide a method for regulating a gas in-home pressure based on smart gas. The method for regulating a gas in-home pressure includes: determining a gas in-home pressure regulation scheme, and the gas in-home pressure regulation scheme including a pressure regulation parameter of a gas device; generating, based on the gas in-home pressure regulation scheme, a pressure regulation instruction; regulating, based on the pressure regulation instruction, a gas in-home pressure of at least one floor; and transmitting the gas in-home pressure regulation scheme to a smart gas user terminal.

One or more embodiments of the present disclosure provide an Internet of Things system for regulating a gas in-home pressure based on smart gas. The Internet of Things system for regulating a gas in-home pressure based on smart gas includes: a smart gas user platform, a smart gas service platform, a smart gas device management platform, a smart gas sensing network platform, and a smart gas object platform interacting in sequence, the smart gas device management platform includes a smart gas device management sub-platform and a smart gas data center, the smart gas device management platform is configured to perform the following operations, including: obtaining gas usage data from at least one gas device via the smart gas sensing network platform and sending the gas usage data to the smart gas device management sub-platform by the smart gas data center, and the at least one gas device being configured in the smart gas object platform; and the smart gas device management platform configured to determine a gas in-home pressure regulation scheme, and the gas in-home pressure regulation scheme including a pressure regulation parameter of a gas device; generate, based on the gas in-home pressure regulation scheme, a pressure regulation instruction; regulate, based on the pressure regulation instruction, a gas in-home pressure of at least one floor; and transmit the gas in-home pressure regulation scheme to a smart gas user terminal.

One or more embodiments of the present disclosure provide a non-transitory computer-readable storage medium, including a set of instructions, wherein when executed by a processor, the method for regulating a gas in-home pressure based on smart gas is implemented.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
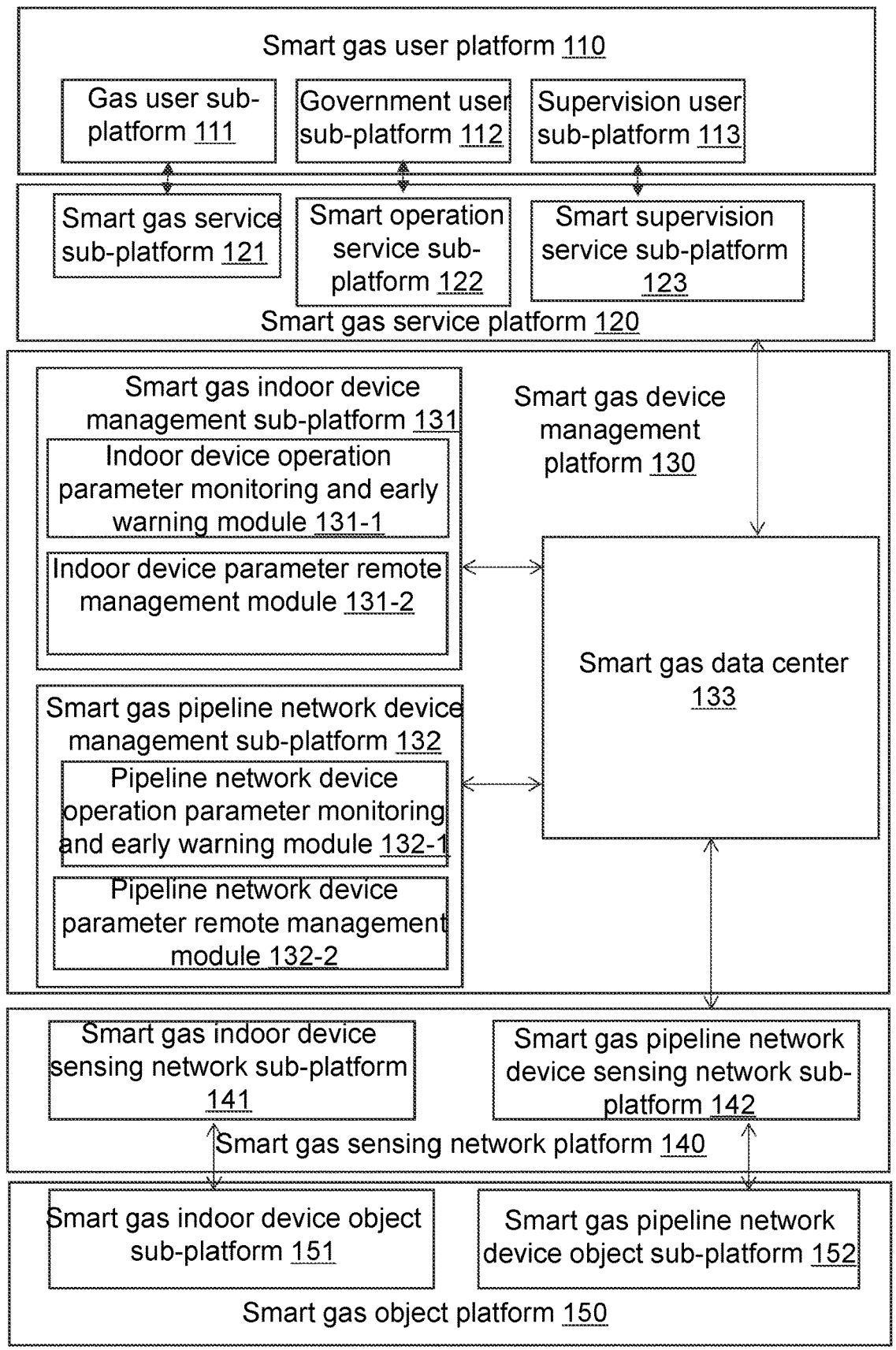
FIG. 1 is a structural diagram illustrating an Internet of Things system for regulating a gas in-home pressure based on smart gas according to some embodiments of the present disclosure.

The technical solutions of the present disclosure embodiments will be more clearly described below, and the accompanying drawings need to be configured in the description of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system", "device", "unit", and/or "module" used herein are one method to distinguish different components, elements, parts, sections, or assemblies of different levels in ascending order. However, the terms may be displaced by other expressions if they may achieve the same purpose As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in the present disclosure, specify the presence of stated steps and elements, but do not preclude the presence or addition of one or more other steps and elements thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is a structural diagram illustrating an Internet of Things system 100 for regulating a gas in-home pressure based on smart gas according to some embodiments of the present disclosure. In some embodiments, the Internet of Things system 100 for regulating a gas in-home pressure based on smart gas may include a smart gas user platform 110, a smart gas service platform 120, a smart gas device management platform 130, a smart gas sensing network platform 140, and a smart gas object platform 150.

In some embodiments, the processing process of information in the Internet of Things may include a processing process of perceptual information and a processing process of control information. The control information may be information generated based on the perceptual information. The processing flow of the perceptual information is as follows: the perceptual information is obtained by the smart gas object platform 150 and is transmitted to the smart gas user platform 110 via the smart gas sensing network platform 140, the smart gas device management platform 130, and the smart gas service platform 120 in turn. The processing flow of the control information is as follows: a user generates the control information via the smart gas user platform 110, and sends it down to the smart gas object platform 150 via the smart gas service platform 120, the smart gas device management platform 120, and the smart gas sensing network platform 120 in turn.

The smart gas user platform 110 is a platform that may be used to interact with a user. In some embodiments, the smart gas user platform 110 may be configured as a terminal device. For example, the terminal device refers to a smart gas user terminal, which may include a terminal device such as a mobile terminal device, a tablet computer, or the like, or any combination thereof. In some embodiments, the smart gas user platform 110 may be used to provide feedback to the user on a pressure regulation parameter of the gas device. For more information about the smart gas user terminal and the pressure regulation parameter, please refer to FIG. 2 and its related descriptions.

In some embodiments, the smart gas user platform 110 may include a gas user sub-platform 111, a government user sub-platform 112, and a supervision user sub-platform 113. In some embodiments, the smart gas user platform 110 may interact bi-directionally downward with the smart gas service platform 120 to send a gas device parameter management information query instruction to the smart gas service platform 120 and receive gas device parameter management information (e.g., a pressure regulation parameter of a gas device) uploaded by the smart gas service platform 120.

The gas user sub-platform 111 is oriented to a gas user in order to provide services related to safe gas usage. The gas user refers to a user who uses gas. In some embodiments, the gas user sub-platform 111 may interact information with a smart gas service sub-platform 121 of the smart gas service platform 120 to obtain a service reminder related to the safe gas usage.

The government user sub-platform 112 is oriented to a government user in order to provide data related to a gas operation. The government user refers to a user responsible for the gas operation. In some embodiments, the government user sub-platform 112 may interact information with a smart operation service sub-platform 122 of the smart gas service platform 120 to obtain data related to the gas operation.

The supervision user sub-platform 113 is oriented to a supervision user and supervises the operation of the entire Internet of Things system 100 for regulating a gas in-home pressure based on smart gas. The supervision user refers to a user of a safety supervision department. In some embodiments, the supervision user sub-platform 113 may interact information with a smart supervision service sub-platform 123 of the smart gas service platform 120 to obtain services for safety supervision needs.

The smart gas service platform 120 may be a platform for receiving and transmitting data and/or information. For example, the smart gas service platform 120 may upload the gas device parameter management information to the smart gas user platform 110. In some embodiments, the smart gas service platform 120 may include the smart gas service sub-platform 121, the smart operation service sub-platform 122, and the smart supervision service sub-platform 123. The smart gas service sub-platform 121 corresponds to the gas user sub-platform 111, and may interact with the gas user sub-platform 111 to provide a gas user with safety gas service; the smart operation service sub-platform 122 corresponds to the government user sub-platform 112, and may interact with the government user sub-platform 112 to provide a government user with gas operation service; the smart supervision service sub-platform 123 corresponds to the supervision user sub-platform 113, and may interact with the supervision user sub-platform 113 to provide a gas supervision user with safety supervision service.

In some embodiments, the smart gas service platform 120 may interact bi-directionally downward with a smart gas data center 133 of the smart gas device management platform 130, send a gas device parameter management information query instruction to the smart gas data center 133, and receive the gas device parameter management information uploaded by the smart gas data center 133.

The smart gas device management platform 130 refers to a platform that coordinates and harmonizes the connection and collaboration between the various functional platforms, aggregates all of the information of the Internet of Things, and provides functions of perceptual management and control management for the Internet of Things operational system. For example, the smart gas device management platform 130 may determine a gas in-home pressure regulation scheme. For example, the smart gas device management platform 130 may generate a pressure regulation instruction based on the gas in-home pressure regulation scheme. As another example, the smart gas device management platform 130 may adjust a gas in-home pressure of at least one floor based on the pressure regulation instruction.

In some embodiments, the smart gas device management platform 130 may include a smart gas indoor device management sub-platform 131, a smart gas pipeline network device management sub-platform 132, and the smart gas data center 133. In some embodiments, the smart gas indoor device management sub-platform 131 and the smart gas pipeline network device management sub-platform 132 may respectively interact with the smart gas data center 133 in a two-way manner. For example, the smart gas indoor device management sub-platform 131 and the smart gas pipeline network device management sub-platform 132 may respectively obtain and feed back management data from the smart gas data center 133. In some embodiments, the smart gas data center 133 may aggregate and store all operational data of the Internet of Things system 100 for regulating a gas in-home pressure based on smart gas. In some embodiments, the smart gas device management platform 130 may interact information with the smart gas service platform 120 and the smart gas sensing network platform 140, respectively, through the smart gas data center 133. For example, the smart gas data center 133 may receive data related to gas device parameter management uploaded by the smart gas sensing network platform 140, send it to the smart gas indoor device management sub-platform 131 and/or the smart gas pipeline network device management sub-platform 132 for processing, and send the aggregated and processed data to the smart gas service platform 120 and/or the smart gas sensing network platform 140. The data related to the gas device parameter management may include metering data and environmental (e.g., an environmental temperature, an atmospheric pressure, etc.) monitoring data of a gas meter.

In some embodiments, the smart gas indoor device management sub-platform 131 may include an indoor device operation parameter monitoring and early warning module 131-1 and an indoor device parameter remote management module 131-2. The indoor device operation parameter monitoring and early warning module 131-1 may view historical and real-time data of indoor device operation parameters and perform monitoring and early warning according to a preset threshold. When the indoor device operation parameters are abnormal, a manager may switch directly from the indoor device operation parameter monitoring and early warning module 131-1 to the indoor device parameter remote management module 131-2 for a remote adjustment of the device parameters, and if necessary, the manager may send reminder information to a gas user through the smart gas service platform 120 (smart gas service sub-platform 121). The indoor device parameter remote management module 131-2 may remotely set and adjust the device parameters of a smart gas indoor device object sub-platform 151, and remotely authorize a device parameter adjustment initiated on-site by the smart gas indoor device object sub-platform 151.

In some embodiments, the smart gas pipeline network device management sub-platform 132 may include a pipeline network device operation parameter monitoring and early warning module 132-1 and a pipeline network device parameter remote management module 132-2. The pipeline network device operation parameter monitoring and early warning module 132-1 may view historical data and real-time data of pipeline network device operation parameters and perform monitoring and early warning based on a preset threshold. When the pipeline network device operation parameters are abnormal, the manager may switch directly from the pipeline network device operation parameter monitoring and early warning module 132-1 to the pipeline network device parameter remote management module 132-2 for a remote adjustment of the device parameters, and, if necessary, the manager may send reminder information to a gas user via the smart gas service platform 120 (smart gas service sub-platform 121). The pipeline network device parameter remote management module 132-2 may remotely set and adjust the device parameters of a smart gas pipeline network device object sub-platform 152, and remotely authorize a device parameter adjustment initiated on-site by the smart gas pipeline network device object sub-platform 152.

In some embodiments, the smart gas device management platform 130 may further include a processor. The processor may be used to perform the method for regulating a gas in-home pressure.

The smart gas sensing network platform 140 may be a functional platform for managing a sensing communication. The smart gas sensing network platform 140 may be configured as a communication network and gateway to perform functions such as network management, protocol management, instruction management, and data parsing. In some embodiments, the smart gas sensing network platform 140 may connect to the smart gas device management platform 130 and the smart gas object platform 150 to implement a perceptual information sensing communication function and a control information sensing communication function. For example, the smart gas sensing network platform 140 may receive data related to gas device parameter management uploaded by the smart gas object platform 150 and issue an instruction of obtaining the data related to the gas device parameter management to the smart gas object platform 150.

In some embodiments, the smart gas sensing network platform 140 may include a smart gas indoor device sensing network sub-platform 141 and a smart gas pipeline network device sensing network sub-platform 142 that may interact in both directions with the smart gas indoor device object sub-platform 151 and the smart gas pipeline network device object sub-platform 152 of the smart gas object platform 150, respectively.

The smart gas object platform 150 may be a functional platform for perceptual information generation and control information execution. In some embodiments, the smart gas object platform 150 may include the smart gas indoor device object sub-platform 151 and the smart gas pipeline network device object sub-platform 152. The smart gas pipeline network device object sub-platform 152 may include a flow meter, a thermometer, a barometer, or the like. The flow meter may be used to obtain an actual transmission flow of the gas pipeline, the thermometer is used to obtain an actual transmission temperature of the gas pipeline, and the barometer is used to obtain an actual transmission air pressure of the gas pipeline. The smart gas indoor device object sub-platform 151 may include an indoor device, and data related to the indoor device may be uploaded to the smart gas data center 133 via the smart gas indoor device sensing network sub-platform 141.

In some embodiments of the present disclosure, the Internet of Things functional architecture of the five platforms is used to implement an in-home pressure regulation of smart gas, which completes a closed-loop information process and makes the information processing of the Internet of Things more smooth and efficient.

It should be noted that the above descriptions of the Internet of Things system for regulating a gas in-home pressure based on smart gas and its components are for descriptive convenience only and not limit the present disclosure to the scope of the cited embodiments. It can be understood that for those skilled in the art, after understanding the principle of the Internet of Things system, it is possible to make any combination of the components or form subsystems to connect with other components without departing from this principle. For example, the smart gas device management platform 130 and the smart gas sensing network platform 140 may be integrated in a single component. As another example, the components may share a common storage module, or each component may have its own storage module. Variations such as these are within the scope of protection of the present disclosure.

Figure 2:
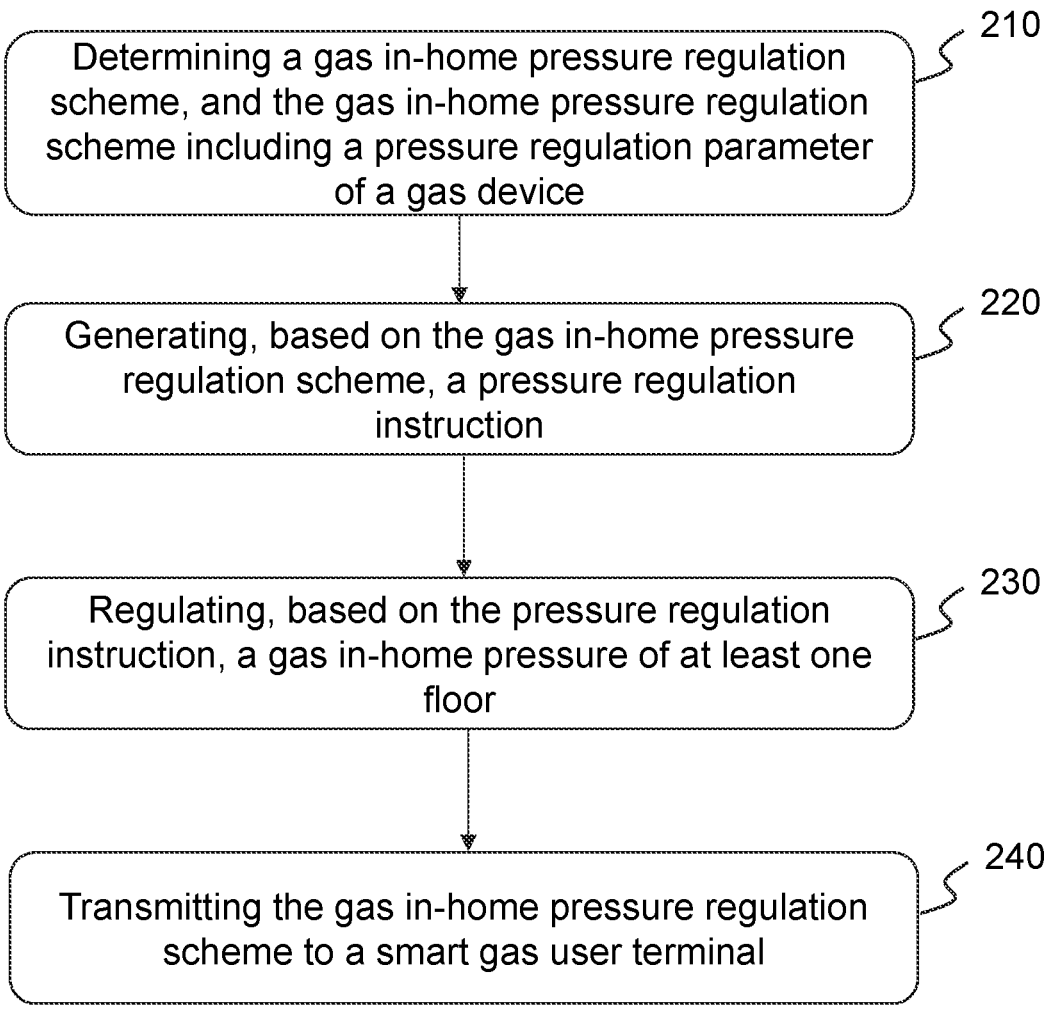
FIG. 2 is a flowchart illustrating an exemplary process for regulating a gas in-home pressure according to some embodiments of the present disclosure.

FIG. 2 is a flowchart illustrating an exemplary process for regulating a gas in-home pressure according to some embodiments of the present disclosure. As shown in FIG. 2, process 200 includes the steps described below. In some embodiments, process 200 may be performed by a processor in the smart gas device management platform 130.

Step 210, determining a gas in-home pressure regulation scheme, and the gas in-home pressure regulation scheme including a pressure regulation parameter of a gas device.

The gas in-home pressure regulation scheme refers to a scheme for regulating a gas in-home pressure value of a gas user. The gas in-home pressure control scheme may include a pressure regulation parameter of a gas device. For example, the gas in-home pressure regulation scheme may be "the pressure regulation parameter is 2300 Pa".

The gas device refers to a gas main or main valve of a building. The pressure regulation parameter of the gas device refers to a gas pressure value (e.g., 2300 Pa) when the gas device delivers gas.

In some embodiments, the gas in-home pressure regulation scheme may be determined based on a preset rule. Exemplarily, the preset rule may be that the pressure regulation parameter may be preset based on a count of building floors. For example, if the count of building floors is 5 or less, the pressure regulation parameter is 2100 Pa; if the count of building floors is 6 to 10, the pressure regulation parameter is 2200 Pa; if the count of building floors is 11 to 15, the pressure regulation parameter is 2300 Pa, and so on.

In some embodiments, the gas in-home pressure regulation scheme may be determined based on current environmental information. For more information about the process of determining the gas in-home pressure regulation scheme, please refer to FIG. 3 or FIG. 6 and their related descriptions.

Step 220, generating, based on the gas in-home pressure regulation scheme, a pressure regulation instruction.

The pressure regulation instruction refers to an instruction for adjusting a pressure regulation parameter of a gas device. For example, the pressure regulation instruction may be "adjust the pressure regulation parameter to 2200 Pa".

In some embodiments, the pressure regulation instruction may be generated based on the content of the gas in-home pressure regulation scheme. For example, if the gas in-home pressure regulation scheme is "the pressure regulation parameter is 2200 Pa", the generated pressure regulation instruction is "adjust the pressure regulation parameter to 2200 Pa".

Step 230, regulating, based on the pressure regulation instruction, a gas in-home pressure of at least one floor.

In some embodiments, the pressure regulation parameter of the gas device may be adjusted based on the pressure regulation instruction, and a gas in-home pressure of each floor may be positively correlated with the pressure regulation parameter and negatively correlated with a floor height.

Step 240, transmitting the gas in-home pressure regulation scheme to a smart gas user terminal.

The smart gas user terminal refers to a terminal device of a user of a gas operator or a government gas operating unit. The terminal device may include a mobile terminal device, a tablet computer, or the like, or any combination thereof. In some embodiments, the smart gas user platform 110 may be configured as the smart gas user terminal.

In some embodiments of the present disclosure, a gas in-home pressure of each floor is regulated by determining an in-home pressure regulation scheme, so that the gas in-home pressure of the each floor is within a normal and safe range, reducing the risk of the gas in-home pressure exceeding the standard.

It should be noted that the above description of process 200 is intended to be exemplary and illustrative only, and does not limit the scope of application of the present disclosure. Various amendments and changes may be made to process 200 for those skilled in the art under the guidance of the present disclosure. However, these amendments and changes remain within the scope of the present disclosure. For example, the determined gas in-home pressure regulation scheme may be modified manually, etc.

Figure 3:
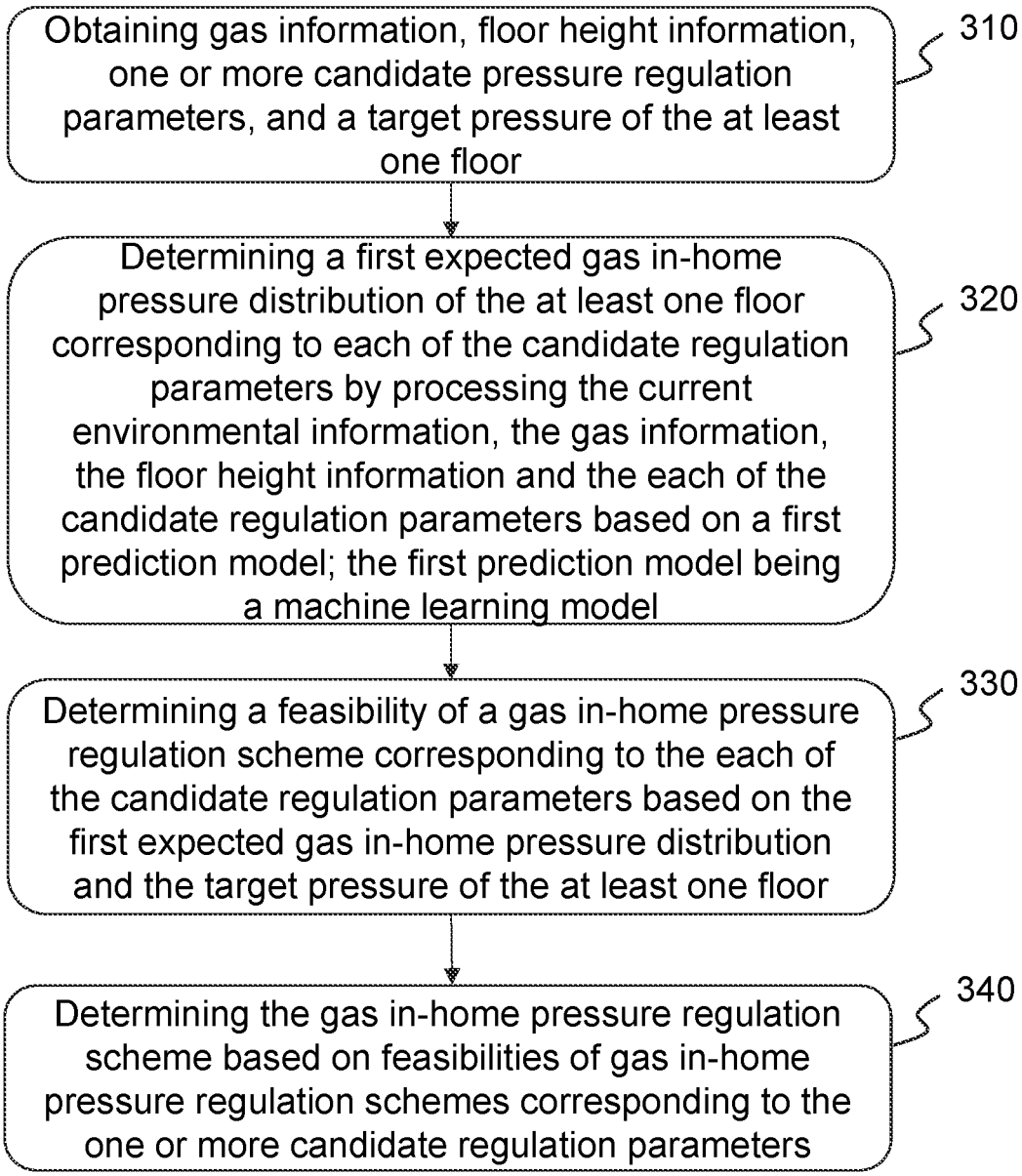
FIG. 3 is a flowchart illustrating an exemplary process for determining a gas in-home pressure regulation scheme according to some embodiments of the present disclosure.

FIG. 3 is a flowchart illustrating an exemplary process for determining a gas in-home pressure regulation scheme according to some embodiments of the present disclosure. As shown in FIG. 3, process 300 includes the steps described below. In some embodiments, process 300 may be performed by a processor in the smart gas device management platform 130.

In some embodiments, a gas in-home pressure regulation scheme may be determined based on current environmental information.

The current environmental information refers to feature information of a surrounding environment where the building is located, and may include an environmental temperature, an atmospheric pressure, etc. For example, the current environmental information may be "the environmental temperature is 25° C. and the atmospheric pressure is 101.25 kPa".

In some embodiments, the current environmental information may be obtained via a thermometer, a barometer, etc., configured in the smart gas object platform 150.

In some embodiments, the gas in-home pressure regulation scheme may be determined through process 300. As shown in FIG. 3, process 300 includes the following steps.

Step 310, obtaining gas information, floor height information, one or more candidate pressure regulation parameters, and a target pressure of the at least one floor.

The gas information refers to information reflecting components and physical and chemical properties of the gas itself. For example, the gas information may be "gas density is 0.72 kg/m3, gas pressure is 0.1 MPa, and impurity ratio is 3%", wherein the gas pressure refers to an air pressure in a gas pipeline that transmits the gas to the gas device.

The floor height information refers to information reflecting a height of an indoor gas facility on each floor from the ground. The indoor gas facility refers to a gas stove, a gas water heater, etc., used by a gas user. In some embodiments, the floor height information may be data in the form of a vector. For example, the floor height information may be (1, 4, 7, 10, . . . ), which represents the following: the height of the indoor gas facility of the 1st floor user from the ground is 1 meter, the height of the indoor gas facility of the 2nd floor user from the ground is 4 meters, the height of the indoor gas facility of the 3rd floor user from the ground is 7 meters, and the height of the indoor gas facility of the 4th floor user from the ground is 10 meters . . . .

The candidate pressure regulation parameter refers to a candidate sample pressure regulation parameter used to determine a pressure regulation parameter. For example, the candidate pressure regulation parameter may be 2200 Pa. The pressure regulation parameter and the candidate pressure regulation parameter may be parameters for the entire building. For more information about the pressure regulation parameter, please refer to FIG. 2 and its related descriptions.

The target pressure refers to a desired in-home pressure at a certain floor, e.g., 2050 Pa.

In some embodiments, the gas information may be obtained from a gas operating user via the smart gas user platform 110; the floor height information may be obtained based on a building design drawing; and the candidate pressure regulation parameter and target pressure may be manually preset based on empirical and/or historical values.

Step 320, determining a first expected gas in-home pressure distribution of the at least one floor corresponding to each of the candidate regulation parameters by processing the current environmental information, the gas information, the floor height information and the each of the candidate regulation parameters based on a first prediction model; the first prediction model being a machine learning model.

The first expected gas in-home pressure distribution corresponding to the each of the candidate pressure regulation parameters refers to data containing an in-home pressure range and a corresponding probability of each floor. The in-home pressure range may be set in decreasing order according to a certain range size and using the candidate regulation parameter as the base. A plurality of in-home pressure ranges may be set (i.e., a count of the in-home pressure ranges may be preset). For example, assuming that the candidate pressure regulation parameter is 2200 Pa, the size of the in-home pressure range is preset to 50 Pa, and the count of the in-home pressure ranges is preset to 4, then the corresponding in-home pressure ranges obtained are (2150, 2200], (2100, 2150], (2050, 2100], and (2000, 2050]. In some embodiments, the first expected gas in-home pressure distribution may be data in the form of a matrix. For example, the first expected gas in-home pressure distribution may be [(50%, 50%, 0, 0), (40%, 40%, 20%, 0), (40%, 30%, 20%, 10%), . . . ], the meaning of which can be found later.

Exemplarily, the process of constructing the first expected gas in-home pressure distribution may include:

constructing a first expected gas in-home pressure vector of each floor. For example, if the candidate pressure regulation parameter is 2200 Pa, the size of the in-home pressure range is preset to 50 Pa, the count of the in-home pressure ranges is preset to 4, and the first expected gas in-home pressure vector of a floor is (45%, 25%, 20%, 10%), it represents that: when the candidate pressure regulation parameter is 2200 Pa, the gas in-home pressure in the range of (2150, 2200] is 45%, in the range of (2100, 2150] is 25%, in the range of (2050, 2100] is 20%, and in the range of (2000, 2050] is 10%.

constructing the first expected gas in-home pressure distribution based on a combination of the first expected gas in-home pressure vector of the each floor. For example, the first expected gas in-home pressure vector of the 1st floor is (50%, 50%, 0, 0), the first expected gas in-home pressure vector of the 2nd floor is (40%, 40%, 20%, 0), the first expected gas in-home pressure vector of the 3rd floor is (40%, 30%, 20%, 10%), . . . , then the constructed first expected gas in-home pressure distribution is [(50%, 50%, 0, 0), (40%, 40%, 20%, 0), (40%, 30%, 20%, 10%), . . . ].

Figure 4:
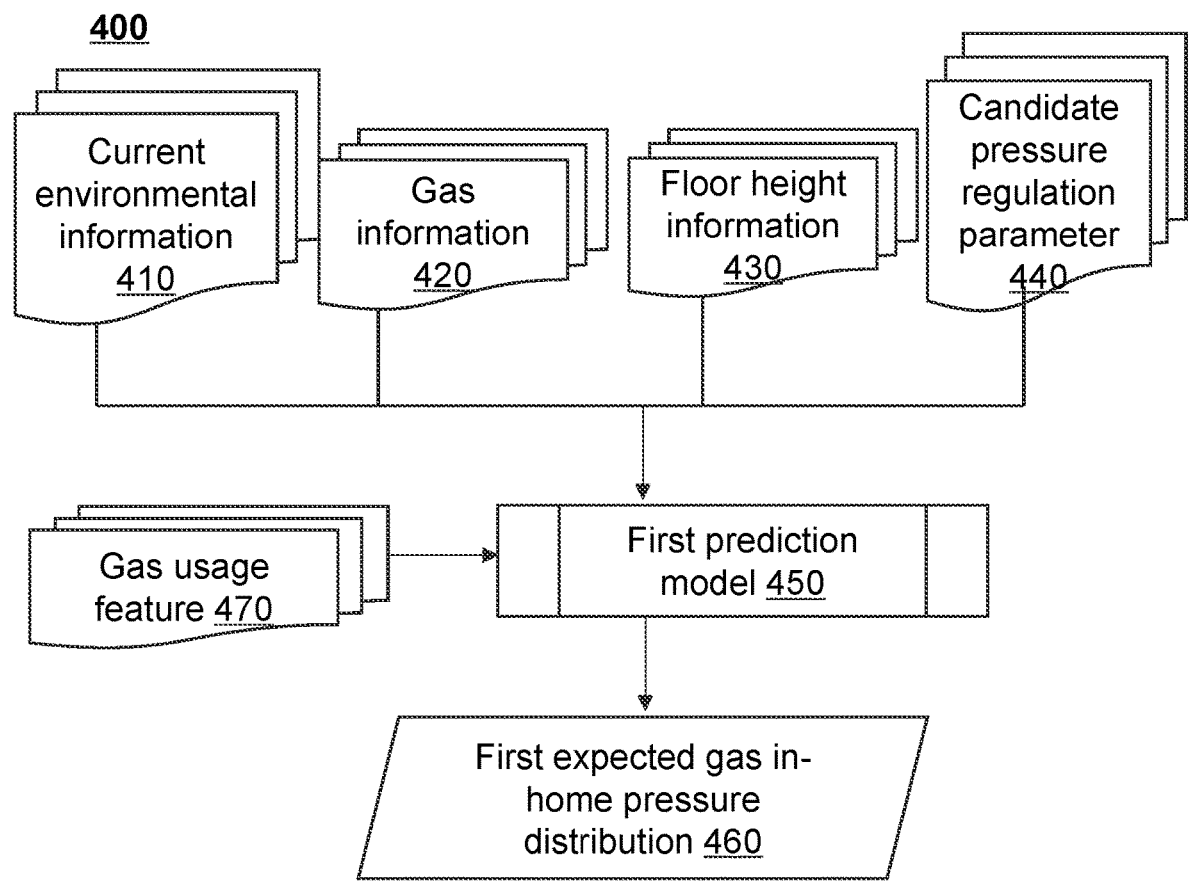
FIG. 4 is a structural diagram illustrating a first prediction model according to some embodiments of the present disclosure.

For more information about the first prediction model, please refer to FIG. 4 and its related descriptions.

Step 330, determining a feasibility of a gas in-home pressure regulation scheme corresponding to the each of the candidate regulation parameters based on the first expected gas in-home pressure distribution and the target pressure of the at least one floor.

The feasibility refers to data that may synthesize an adaptation degree of the first expected gas in-home pressure vector at each floor to a target pressure of the each floor after applying the gas in-home pressure regulation scheme corresponding to the candidate pressure regulation parameter.

In some embodiments, the processor in the smart gas device management platform 130 may determine the feasibility of the gas in-home pressure regulation scheme corresponding to the candidate regulation parameter based on a variety of ways. Continuing with the previous example, assuming that the candidate regulation parameter is 2200 Pa, the size of the in-home pressure range is preset to 50 Pa, the count of the in-home pressure ranges is preset to 4, the first expected gas in-home pressure vector of each floor respectively is (50%, 30%, 15%, 5%), (40%, 30%, 20%, 10%), and (35%, 29%, 20%, 16%), and the target pressure respectively is 2120 Pa (in the range of (2100, 2150]), 2090 Pa (in the range of (2050, 2100]), and 2030 Pa (in the range of (2000, 2050] range), then the first expected gas in-home pressure vector of each floor respectively is 30%, 20%, and 16%, and the feasibility of the gas in-home pressure regulation scheme corresponding to the candidate regulation parameters is 30%+20%+16%)/3=22%.

In some embodiments, the feasibility of the gas in-home pressure regulation scheme corresponding to the each of the candidate regulation parameters may be obtained based on a second prediction model and an evaluation model. For more information about the second prediction model and the evaluation model, please refer to FIG. 5 and its related descriptions.

Step 340, determining the gas in-home pressure regulation scheme based on feasibilities of gas in-home pressure regulation schemes corresponding to the one or more candidate regulation parameters.

In some embodiments, the candidate pressure regulation parameters meeting a preset condition may be averaged, and the average result is used as a finalized pressure regulation parameter in the gas in-home pressure regulation scheme. The preset condition may be that the feasibility of the candidate pressure regulation parameter corresponding to the gas in-home pressure regulation scheme is greater than a feasibility threshold. The feasibility threshold may be a default value, an empirical value, a human pre-defined value, or any combination thereof, and may be set according to actual needs, without limitation in the present disclosure. For example, the candidate pressure regulation parameters are 2170 Pa, 2150 Pa, 2100 Pa, 2080 Pa, and 2050 Pa, and the feasibility of the corresponding gas in-home pressure regulation schemes are 90%, 85%, 70%, 65%, and 50%, respectively, and the feasibility threshold is preset to 60%, then the finalized pressure regulation parameter in the gas in-home pressure regulation scheme is 2125 ((2170+2150+2100+2080)/4) Pa.

In some embodiments of the present disclosure, the safety and adaptability of the determined gas in-home pressure regulation scheme is further improved by determining the feasibility.

It should be noted that the above description of process 300 is intended to be exemplary and illustrative only and does not limit the scope of application of the present disclosure. Various amendments and changes may be made to process 300 for those skilled in the art under the guidance of the present disclosure. However, these amendments and changes remain within the scope of the present disclosure.

For example, ways such as weighted average may be used in determining the pressure regulation parameter in the gas in-home pressure regulation scheme.

FIG. 4 is a structural diagram illustrating a first prediction model according to some embodiments of the present disclosure.

In some embodiments, the smart gas device management platform 130 may determine a first expected gas in-home pressure distribution of at least one floor based on a first prediction model by processing the current environmental information, the gas information, the floor height information, and the each of the candidate pressure regulation parameters.

The first prediction model refers to a machine learning model for determining a first expected gas in-home pressure distribution. In some embodiments, the first prediction model may include any one or a combination of various feasible models such as a recurrent neural network (RNN) model, a deep neural network (DNN) model, and a convolutional neural network (CNN) model.

As shown in FIG. 4, an input of the first prediction model 450 may include current environmental information 410, gas information 420, floor height information 430, and a candidate pressure regulation parameter 440, and an output may include a first expected gas in-home pressure distribution of at least one floor 460.

In some embodiments, the first prediction model 450 may be obtained by training a plurality of labeled first training samples. For example, a plurality of first training samples with first labels may be input to an initial first prediction model, a loss function is constructed from the first labels and the results of the initial first prediction model, and the parameters of the initial first prediction model are updated iteratively based on the loss function. The model training is completed when the loss function of the initial first prediction model meets a preset condition for the end of the training, and a trained first prediction model is obtained. The preset condition for the end of the training may be that the loss function converges, a count of iterations reaches a threshold, etc.

In some embodiments, the first training samples may include sample environmental information, sample gas information, sample floor height information, and sample candidate pressure regulation parameters. The first labels include actual gas in-home pressure distributions corresponding to the first training samples. The sample environmental information and the actual gas in-home pressure distribution may be obtained based on historical monitoring records of thermometers and barometers configured in the smart gas object platform 150. The sample gas information may be obtained based on gas transmission records through the smart operation service sub-platform 122. The sample floor height information and the sample candidate pressure regulation parameters may be obtained based on historical floor height information and historical pressure regulation parameters, respectively. The first labels may be determined based on manual annotation.

In some embodiments, the input of the first prediction model 450 may also include a gas usage feature 470. For more information about the gas usage feature, please refer to FIG. 7 and its related descriptions.

In some embodiments, the output of the first prediction model 450 may be correlated with a Gaussian distribution.

In some embodiments, if the input of the first prediction model 450 includes the gas usage feature 470, then the first training samples used in the training of the first prediction model 450 may also include sample gas usage features. The sample gas usage features may be obtained through a first embedding layer of a third prediction model based on the gas usage information. For more information about the gas usage information, please refer to FIG. 6 and its related descriptions. For more information about the first embedding layer of the third prediction model, please refer to FIG. 7 and its related descriptions.

In some embodiments of the present disclosure, determining the first expected gas in-home pressure distribution of each floor by the first prediction model improves the efficiency of the determination and the accuracy of the determined first expected gas in-home pressure distribution.

In some embodiments of the present disclosure, the accuracy of the determined first expected gas in-home pressure distribution is further improved by introducing a gas usage feature as an input of the first prediction model.

Figure 5:
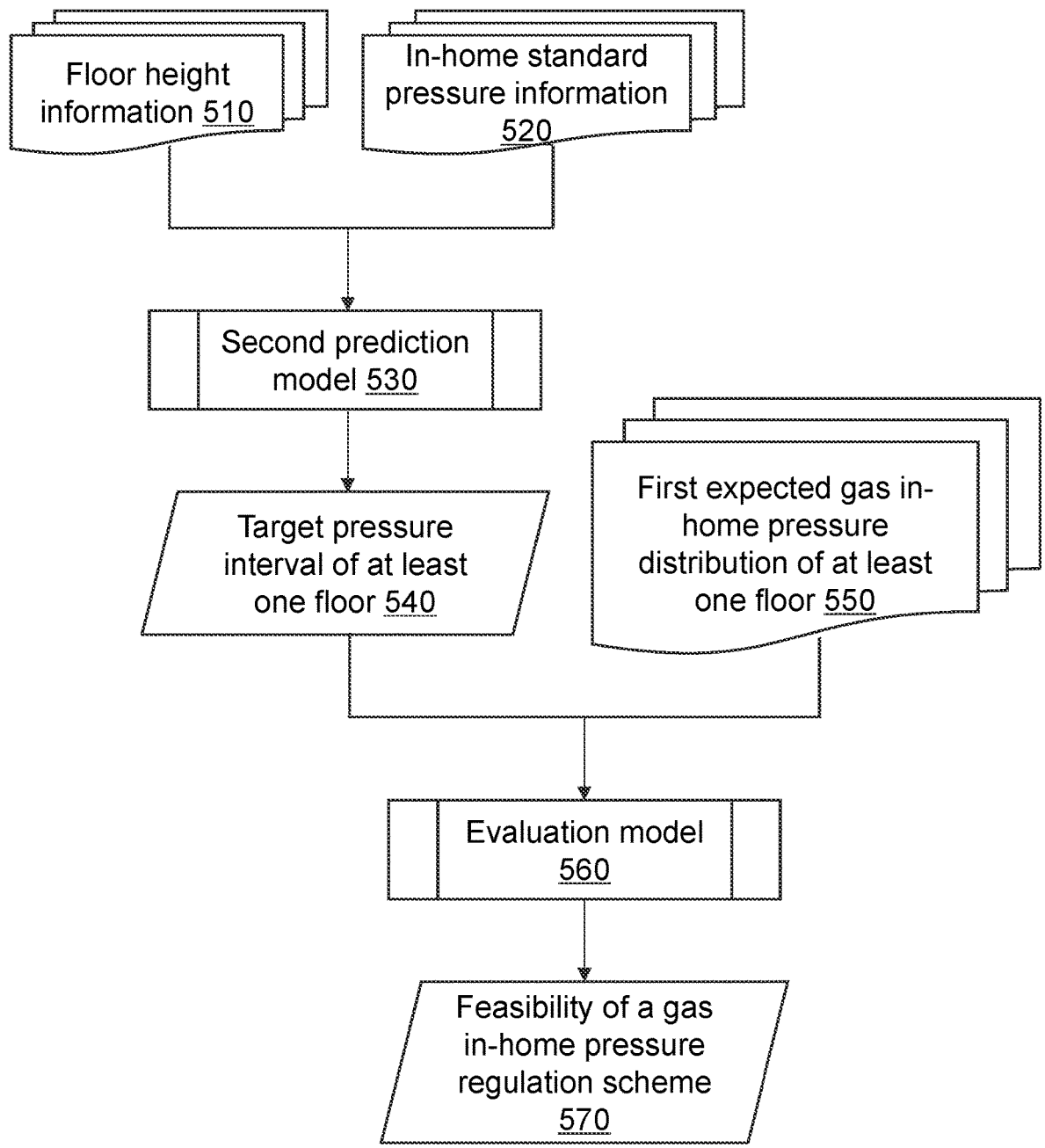
FIG. 5 is a structural diagram illustrating a second prediction model and an evaluation model according to some embodiments of the present disclosure.

FIG. 5 is a structural diagram illustrating a second prediction model and an evaluation model according to some embodiments of the present disclosure.

In some embodiments, the determining a feasibility of the gas in-home pressure regulation scheme corresponding to the each of the candidate pressure regulation parameters based on the first expected gas in-home pressure distribution and a target pressure of the at least one floor may include the following steps:

obtaining in-home standard pressure information;
determining a target pressure interval of the at least one floor by processing the floor height information and the in-home standard pressure information based on a second prediction model;
determining the feasibility of the gas in-home pressure regulation scheme corresponding to the each of the candidate pressure regulation parameters by processing the first expected gas in-home pressure distribution of the at least one floor and the target pressure interval of the at least one floor based on an evaluation model.

In some embodiments, the smart gas device management platform 130 may determine the target pressure interval of the at least one floor by processing the floor height information and the in-home standard pressure information based on the second prediction model.

The in-home standard pressure information refers to a standard reference value of the gas in-home pressure set by a government user. For example, the in-home standard pressure information may be 2000 Pa. In some embodiments, the value of the in-home standard pressure information may be a range with a unit of Pa, e.g., [2000, 2050]. The in-home standard pressure information may be preset by a supervision user.

The target pressure interval refers to a numerical interval in which a desired in-home pressure of a certain floor is located. For example, the target pressure interval may be [2050, 2100] with a unit of Pa. The target pressure interval may be manually preset based on empirical and/or historical values, or determined based on the second prediction model.

For more information about the floor height information, please refer to FIG. 3 and its related descriptions.

The second prediction model refers to a machine learning model for determining a target pressure interval. In some embodiments, the second prediction model may include any one or a combination of various feasible models such as a recurrent neural network (RNN) model, a deep neural network (DNN) model, and a convolutional neural network (CNN) model.

As shown in FIG. 5, an input of the second prediction model 530 may include floor height information 510 and in-home standard pressure information 520, and an output may include a target pressure interval of at least one floor 540.

In some embodiments, the smart gas device management platform 130 may determine the feasibility of the gas in-home pressure regulation scheme by processing the target pressure interval of the at least one floor and the first expected gas in-home pressure distribution of the at least one floor based on the evaluation model.

The evaluation model refers to a machine learning model for determining a feasibility of a gas in-home pressure regulation scheme. In some embodiments, the evaluation model may include any one or a combination of various feasible models such as a recurrent neural network (RNN) model, a deep neural network (DNN) model, a convolutional neural network (CNN) model.

As shown in FIG. 5, an input of the evaluation model 560 may include a target pressure interval of at least one floor 540 and a first expected gas in-home pressure distribution of at least one floor 550, and an output may include a feasibility of a gas in-home pressure regulation scheme 570. For more information about the first expected gas in-home pressure distribution and the feasibility of the gas in-home pressure regulation scheme, please refer to FIG. 3 and the related descriptions.

In some embodiments, the second prediction model 530 and the evaluation model 560 may be obtained by joint training. The sample data of the joint training may be a plurality of second training samples with labels, and the second training samples may include sample floor height information, sample in-home standard pressure information, and sample first expected gas in-home pressure distribution of at least one floor, and the labels may be sample feasibilities of gas in-home pressure regulation schemes corresponding to the second training samples. The sample floor height information may be obtained based on historical floor height information. The sample in-home standard pressure information may be manually preset. The sample first expected gas in-home pressure distribution of at least one floor may be determined based on a historical gas in-home pressure distribution. The labels of the second training samples may be determined based on manual annotation.

An exemplary joint training process may include: inputting the sample floor height information and the sample in-home standard pressure information into an initial second prediction model to obtain a target pressure interval of at least one floor output by the initial second prediction model; taking the target pressure interval of the at least one floor output by the initial second prediction model as training sample data, inputting the target pressure interval together with the sample first expected gas in-home pressure distribution of the at least one floor into the initial evaluation model to obtain the feasibility of the gas in-home pressure regulation scheme output by the initial evaluation model; based on the labels of the second training samples and the feasibility of the gas in-home pressure regulation scheme output by the initial evaluation model, updating parameters of the initial second prediction model and the initial evaluation model simultaneously. The model training is completed when a loss function meets a preset condition at the end of training, and a trained second prediction model and evaluation model are obtained. The preset condition for the end of training may be a loss function convergence, a count of iterations reaching a threshold, etc.

In some embodiments of the present disclosure, the accuracy of the feasibility of the determined gas in-home pressure regulation scheme can be further improved by determining the feasibility of the gas in-home pressure regulation scheme through the second prediction model and the evaluation model.

Figure 6:
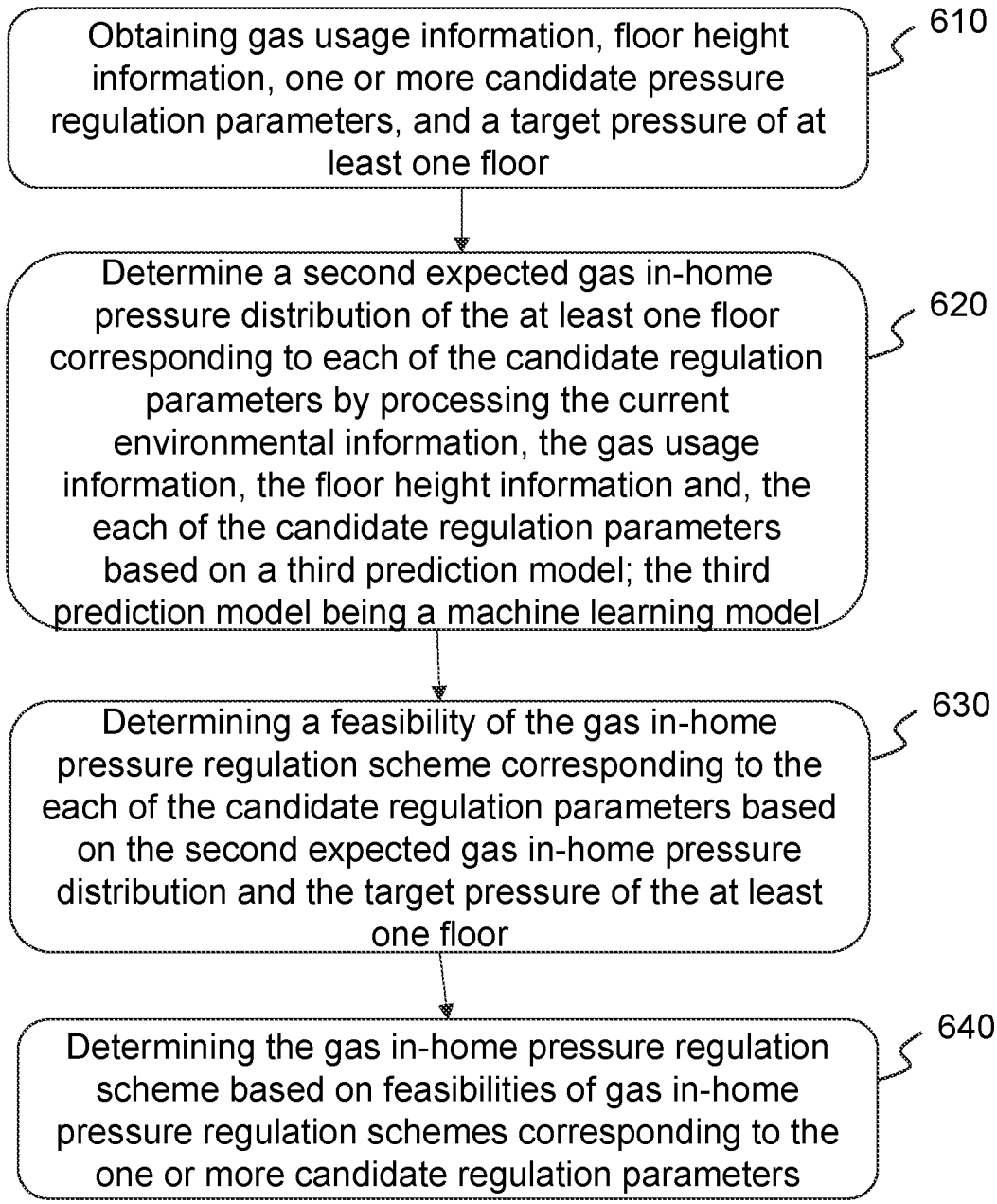
FIG. 6 is a flowchart illustrating another exemplary process for determining the gas in-home pressure regulation scheme according to some embodiments of the present disclosure.

FIG. 6 is a flowchart illustrating another exemplary process for determining the gas in-home pressure regulation scheme according to some embodiments of the present disclosure. As shown in FIG. 6, process 600 includes the steps described below. In some embodiments, process 600 may be performed by a processor in the smart gas device management platform 130.

Step 610, obtaining gas usage information, floor height information, one or more candidate pressure regulation parameters, and a target pressure of at least one floor.

The gas usage information refers to information reflecting gas usage of users on each floor, and may include an average daily gas usage and an average monthly gas usage day of the each floor. For example, the gas usage information may be "the average daily gas usage of the 1st floor users is 0.75 m$^3$ and the average monthly gas usage day is 29 days; the average daily gas usage of the 2nd floor users is 0.8 m$^3$ and the average monthly gas usage day is 28 days; the average daily gas usage of the 3rd floor users is 0.77 m$^3$ and the average monthly gas usage day is 30 days . . . ". The gas usage information may be obtained based on gas usage records of the users.

In some embodiments, the gas usage information may be data in the form of a vector. For example, a gas usage information vector is constructed according to the gas usage information of the above example as (1, 0.75, 29, 2, 0.8, 28, 3, 0.77, 30 . . . ).

For more information about the floor height information and the candidate pressure regulation parameters, please refer to FIG. 3 and its related descriptions.

Step 620, determine a second expected gas in-home pressure distribution of the at least one floor corresponding to each of the candidate regulation parameters by processing the current environmental information, the gas usage information, the floor height information, and the each of the candidate regulation parameters based on a third prediction model; the third prediction model being a machine learning model.

The second expected gas in-home pressure distribution corresponding to the each of the candidate pressure regulation parameter refers to data containing an in-home pressure range and a corresponding probability of each floor, which may be of a same form, a composition, and a construction as the first expected gas in-home pressure distribution. For more information about the first expected gas in-home pressure distribution, please refer to FIG. 3 and its related descriptions.

Step 630, determining a feasibility of the gas in-home pressure regulation scheme corresponding to the each of the candidate regulation parameters based on the second expected gas in-home pressure distribution and the target pressure of the at least one floor.

In some embodiments, the feasibility of the gas in-home pressure regulation scheme corresponding to the each of the candidate pressure regulation parameters may be obtained based on the second prediction model and the evaluation model. For more information about the feasibility, please refer to FIG. 3 and its related description. For more information about the second prediction model and the evaluation model, please refer to FIG. 5 and its related description.

Step 640, determining the gas in-home pressure regulation scheme based on feasibilities of gas in-home pressure regulation schemes corresponding to the one or more of the candidate regulation parameters.

In some embodiments, the candidate pressure regulation parameters that meet a preset condition may be averaged, and the average result thereof is used as a pressure regulation parameter in the gas in-home pressure regulation scheme. The preset condition may be that the candidate pressure regulation parameter corresponds to a gas in-home pressure regulation scheme that has a feasibility greater than a feasibility threshold. The feasibility threshold may be a system default value, an empirical value, a human pre-set value, or any combination thereof, and may be set according to actual needs, without restriction in the present disclosure.

In some embodiments of the present disclosure, determining a gas in-home pressure distribution by a model different from the preceding can adapt to the needs of determining a gas in-home pressure distribution under different conditions.

It should be noted that the above description of process 600 is intended to be exemplary and illustrative only and does not limit the scope of application of the present disclosure. For those skilled in the art, various amendments and changes may be made to process 600 under the guidance of the present disclosure. However, these amendments and changes remain within the scope of the present disclosure. For example, ways such as weighted average may be used in determining the pressure regulation parameter in the gas in-home pressure regulation scheme.

Figure 7:
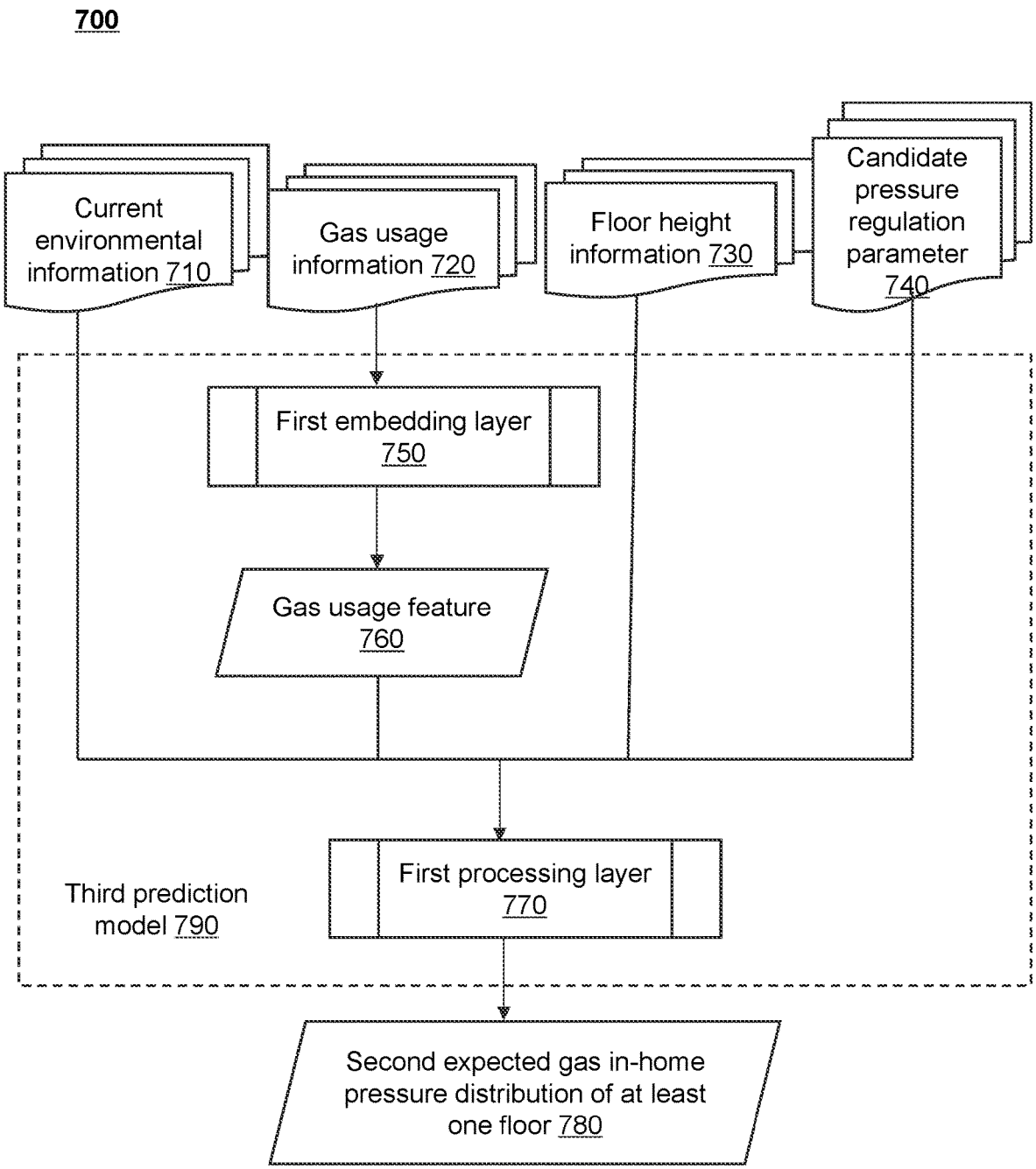
FIG. 7 is a structural diagram illustrating a third prediction model according to some embodiments of the present disclosure.

FIG. 7 is a structural diagram illustrating a third prediction model according to some embodiments of the present disclosure.

In some embodiments, the smart gas device management platform 130 may determine the second expected gas in-home pressure distribution of the at least one floor based on the third prediction model by processing the current environmental information, the gas usage information, the floor height information, and the each of the candidate pressure regulation parameters.

The third prediction model refers to a machine learning model for determining a second expected gas in-home pressure distribution. In some embodiments, the third prediction model may include any one or a combination of various feasible models such as a recurrent neural network (RNN) model, a deep neural network (DNN) model, a convolutional neural network (CNN) model.

As shown in FIG. 7, an input of the third prediction model 790 may include current environmental information 710, gas usage information 720, floor height information 730, and a candidate pressure regulation parameter 740, and an output may be a second expected gas in-home pressure distribution of at least one floor 780. For more information about the current environmental information, the floor height information, and the candidate pressure regulation parameters, please refer to FIG. 3 and its related descriptions. For more information about the gas usage information, please refer to FIG. 6 and its related description.

In some embodiments, the third prediction model may include a plurality of processing layers. As shown in FIG. 7, the third prediction model 790 may include a first embedding layer 750 and a first processing layer 770.

The first embedding layer 750 may be used to process the gas usage information 720 to determine a gas usage feature 760.

The gas usage feature refers to feature data that is generated based on the gas usage information and may reflect a gas usage of a user. In some embodiments, the gas usage feature may be data in the form of a matrix. For example, the gas usage feature may be [(0.75, 29), (0.8, 28), (0.77, 30), . . . ], which represents that: the average daily gas usage of the 1st floor users is 0.75 m$^3$ and the average monthly gas usage of the 1st floor users is 29 days; the average daily gas usage of the 2nd floor users is 0.8 m$^3$, and the average monthly gas usage of the 2nd floor users is 28 days; the average daily gas usage of the 3rd floor users is 0.77 m$^3$, and the average monthly gas usage of the 3rd floor users is 30 days . . . .

The first processing layer 770 may be used to process the current environmental information 710, the gas usage feature 760, the floor height information 730, and the candidate pressure regulation parameter 740 to determine the second expected gas in-home pressure distribution of the least one floor 780. For more information about the second expected gas in-home pressure distribution, please refer to FIG. 6 and its related description.

In some embodiments, the first embedding layer 750 and the first processing layer 770 of the third prediction model 790 may be obtained by a joint training. The sample data of the joint training may be a plurality of third training samples with labels, and the third training samples may include sample environmental information, sample gas usage information, sample floor height information, and sample candidate pressure regulation parameters. The labels of the third training samples may be an actual gas in-home pressure distribution corresponding to the third training samples. The sample floor height information and the sample candidate pressure regulation parameters may be obtained based on historical floor height information and historical pressure regulation parameters, respectively; the sample environment information and the actual gas in-home pressure distribution may be obtained based on historical monitoring records of thermometers and barometers configured in the smart gas object platform 150; and the sample gas usage information may be obtained based on historical gas usage records of the user. The labels of the third training sample may be determined based on manual annotation.

An exemplary joint training process may include: inputting the sample gas usage information into an initial first embedding layer to obtain a gas usage feature output by the initial first embedding layer; taking the gas usage feature output by the initial first embedding layer as training sample data, and inputting the gas usage feature along with the sample environmental information, the sample floor height information, and the sample candidate pressure regulation parameters into an initial first processing layer to obtain a second expected gas in-home pressure distribution of at least one floor output by the initial first processing layer; simultaneously updating parameters of the initial first embedding layer and the initial first processing layer based on the labels of the third training samples and the second expected gas in-home pressure distribution of at least one floor output by the initial first processing layer. The model training is completed when a loss function meets a preset condition for the end of training, and a trained first embedding layer and first processing layer are obtained. The preset condition for the end of training may be a loss function convergence, a count of iterations reaching a threshold, etc.

In some embodiments, the output of the third prediction model 790 may be correlated with a Gaussian distribution.

In some embodiments, the output of the third prediction model 790 may further include a variance of the Gaussian distribution corresponding to the second expected gas in-home pressure distribution of the at least one floor.

In some embodiments of the present disclosure, the second expected gas in-home pressure distribution of each floor is determined by the third prediction model, which improves the efficiency of the determination and the accuracy of the determined second expected gas in-home pressure distribution.

In some embodiments of the present disclosure, a fluctuation in the in-home pressure of users of the each floor included in the second expected gas in-home pressure distribution can be reflected by outputting the variance of the Gaussian distribution, which can improve the confidence of the output pressure distribution.

Figure 8:
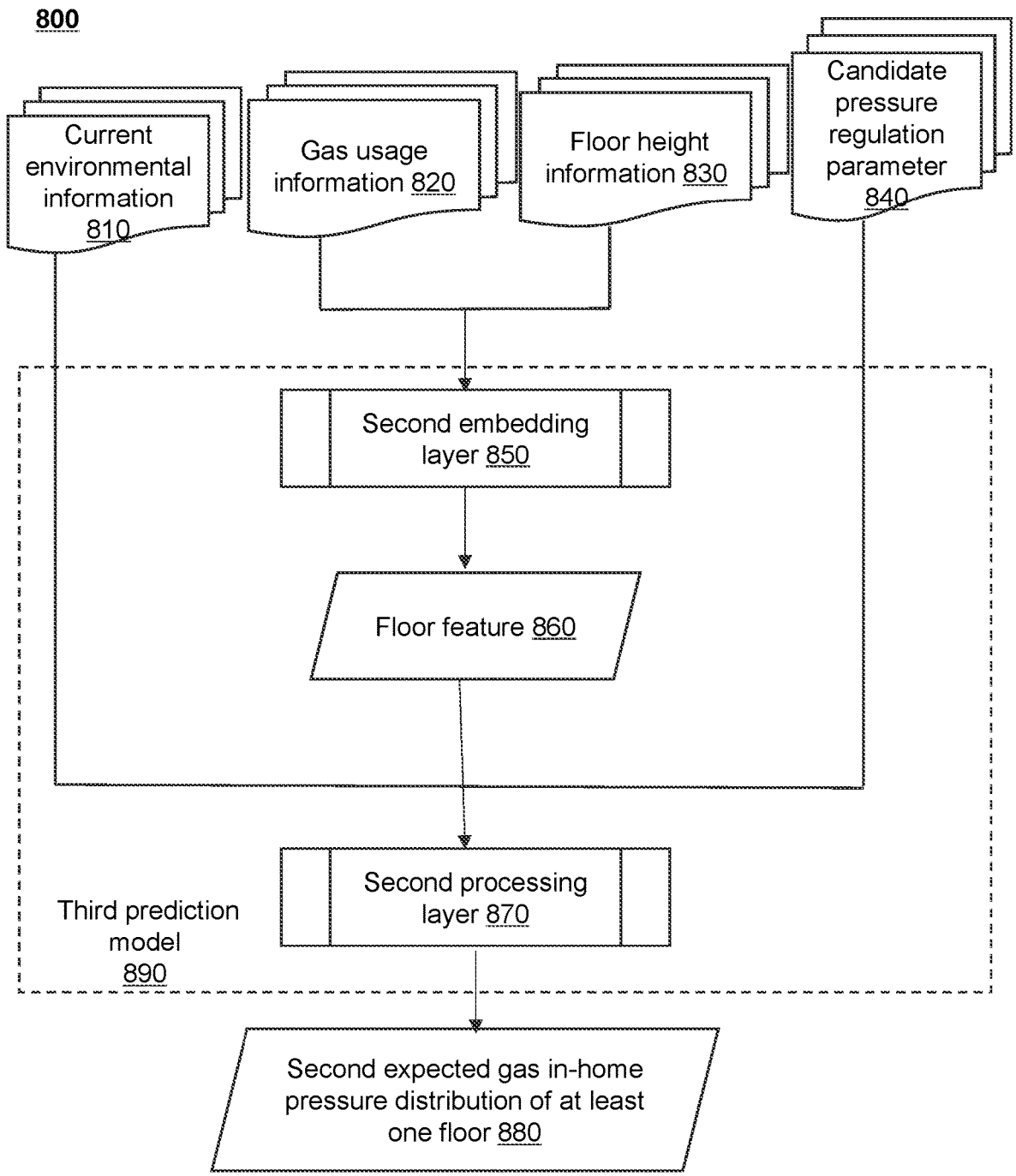
FIG. 8 is another structural diagram illustrating the third prediction model according to some embodiments of the present disclosure.

FIG. 8 is another structural diagram illustrating the third prediction model according to some embodiments of the present disclosure.

In some embodiments, as shown in FIG. 8, the third prediction model 890 may include a second embedding layer 850 and a second processing layer 870. In some embodiments, the structure of the third prediction model may be a long short-term memory (LSTM) structure.

The second embedding layer 850 may be used to process gas usage information 820 and floor height information 830 to determine a floor feature 860. For more information about the floor height information, please refer to FIG. 3 and its related description. For more information about the gas usage information, please refer to FIG. 6 and its related description.

The floor feature refers to feature data that is generated based on the gas usage information and the floor height information and that may comprehensively reflect a gas usage situation and a floor height situation of a user. In some embodiments, the floor feature may be data in the form of a matrix. For example, the floor feature may be [(0, 0.75, 29), (3, 0.8, 28), (6, 0.77, 30), . . . ], which represents that: the floor height of the 1st floor users is 0, the average daily gas usage of the 1st floor users is 0.75 $m^3$, and the average monthly gas usage of the 1st floor users is 29 days; the floor height of the 2nd floor users is 3 m, the average daily gas usage of the 2nd floor users is 0.8 $m^3$, and the average monthly gas usage of the 2nd floor users is 28 days; and the floor height of the 3rd floor users is 6 m, the average daily gas usage of the 3rd floor users is 0.77 $m^3$, and the average monthly gas usage of the 1st floor users is 30 days . . . .

The second processing layer 870 may be used to process the current environmental information 810, the floor feature 860, and the candidate pressure regulation parameter 840 to determine the second expected gas in-home pressure distribution of at least one floor 880. For more information about the current environmental information, please refer to FIG. 3 and its related description. For more information about the second expected gas in-home pressure distribution, please refer to FIG. 6 and its related descriptions.

In some embodiments, the second embedding layer 850 and the second processing layer 870 of the third prediction model 890 may be obtained by a joint training. The sample data of the joint training may be a plurality of fourth training samples with labels, and the fourth training samples may include sample environmental information, sample gas usage information, sample floor height information, and sample candidate pressure regulation parameters. The labels of the fourth training samples may be an actual gas in-home pressure distribution corresponding to the fourth training samples. The sample floor height information and the sample candidate pressure regulation parameters may be obtained based on historical floor height information and historical pressure regulation parameters, respectively; the sample environment information and the actual gas in-home pressure distribution may be obtained based on historical monitoring records of thermometers and barometers configured in the smart gas object platform 150; and the sample gas usage information may be obtained based on historical gas usage records of the user. The labels of the fourth training samples may be determined based on manual annotation.

An exemplary joint training process may include: inputting the sample gas usage information and the sample floor height information into a second initial embedding layer to obtain a floor feature output by the second initial embedding layer; inputting the floor feature output by the second initial embedding layer as training sample data, along with the sample environmental information and the sample candidate pressure regulation parameters, into a second initial processing layer to obtain a second expected gas in-home pressure distribution of at least one floor; based on the labels of the fourth training samples and the second expected gas in-home pressure distribution of at least one floor outputted by the initial second processing layer, the parameters of the initial second embedding layer and the initial second processing layer are updated simultaneously. The model training is completed when a loss function meets a preset condition for the end of training, and the trained second embedding layer and the second processing layer are obtained. The preset condition for the end of training may be a loss function convergence, a count of iterations reaching a threshold number of iterations, etc.

In some embodiments of the present disclosure, the accuracy of the determined second expected gas in-home pressure distribution is further improved by determining the second expected gas in-home pressure distribution of the each floor by the third prediction model with different structures.

The present disclosure provides a non-transitory computer-readable storage medium, comprising a set of instructions, wherein when executed by a processor, a method for regulating a gas in-home pressure based on smart gas is implemented.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for regulating a gas in-home pressure based on smart gas, performed by a processor in a smart gas device management platform of an Internet of Things system for regulating a gas in-home pressure based on smart gas, and the method comprising:
   determining a gas in-home pressure regulation scheme based on current environmental information, and the gas in-home pressure regulation scheme including a pressure regulation parameter of a gas device;
   generating, based on the gas in-home pressure regulation scheme, a pressure regulation instruction;
   regulating, based on the pressure regulation instruction, a gas in-home pressure of at least one floor; and
   transmitting the gas in-home pressure regulation scheme to a smart gas user terminal, wherein the determining the gas in-home pressure regulation scheme based on current environmental information includes:
      obtaining gas information, floor height information, one or more candidate pressure regulation parameters, and a target pressure of the at least one floor;
      determining a first expected gas in-home pressure distribution of the at least one floor corresponding to each of the candidate regulation parameters by processing the current environmental information, the gas information, the floor height information and the each of the candidate regulation parameters based on a first prediction model; the first prediction model being a machine learning model;
      determining a feasibility of a gas in-home pressure regulation scheme corresponding to the each of the candidate regulation parameters based on the first expected gas in-home pressure distribution and the target pressure of the at least one floor; and
      determining the gas in-home pressure regulation scheme based on feasibilities of gas in-home pressure regulation schemes corresponding to the one or more candidate regulation parameters, wherein the determining a feasibility of a gas in-home pressure regulation scheme corresponding to the each of the candidate regulation parameters based on the first expected gas in-home pressure distribution and the target pressure of the at least one floor includes:
         obtaining in-home standard pressure information;
         determining a target pressure interval of the at least one floor by processing the floor height information and the in-home standard pressure information based on a second prediction model; the second prediction model being a machine learning model; and
         determining the feasibility of the gas in-home pressure regulation scheme corresponding to the each of the candidate pressure regulation parameters by processing the first expected gas in-home pressure distribution of the at least one floor and the target pressure interval of the at least one floor based on an evaluation model; and the evaluation model being a machine learning model.

2. The method of claim 1, wherein the determining the gas in-home pressure regulation scheme based on current environmental information includes:
   obtaining gas usage information, floor height information, one or more candidate pressure regulation parameters, and a target pressure of the at least one floor;
   determining a second expected gas in-home pressure distribution of the at least one floor corresponding to each of the candidate regulation parameters by processing the current environmental information, the gas usage information, the floor height information and the each of the candidate regulation parameters based on a third prediction model; the third prediction model being a machine learning model;

determining a feasibility of a gas in-home pressure regulation scheme corresponding to the each of the candidate regulation parameters based on the second expected gas in-home pressure distribution and the target pressure of the at least one floor; and determining the gas in-home pressure regulation scheme based on feasibilities of gas in-home pressure regulation schemes corresponding to the one or more candidate regulation parameters.

3. The method of claim 2, wherein the third prediction model includes a second embedding layer and a second processing layer;

the determining a second expected gas in-home pressure distribution of the at least one floor corresponding to each of the candidate regulation parameters by processing the current environmental information, the gas usage information, the floor height information and each of the candidate regulation parameters based on a third prediction model includes:

determining a floor feature by processing the gas usage information and the floor height information based on the second embedding layer; and determining the second expected gas in-home pressure distribution of the at least one floor corresponding to the each of the candidate regulation parameters by processing the current environment information, the floor feature, and the each of the candidate regulation parameters based on the second processing layer.

4. The method of claim 1, wherein the Internet of Things system for regulating a gas in-home pressure based on smart gas further includes a smart gas user platform, a smart gas service platform, a smart gas sensing network platform, and a smart gas object platform;

current environmental information, floor height information, and gas usage information are obtained based on the smart gas object platform and transmitted to the smart gas device management platform based on the smart gas sensing network platform; and gas information is obtained based on the smart gas user platform and transmitted to the smart gas device management platform based on the smart gas service platform.

5. A non-transitory computer-readable storage medium, comprising a set of instructions, wherein when executed by a processor, the method for regulating a gas in-home pressure based on smart gas in claim 1 is implemented.

6. An Internet of Things system for regulating a gas in-home pressure based on smart gas, wherein the Internet of Things system for regulating smart gas in-home pressure includes a smart gas user platform, a smart gas service platform, a smart gas device management platform, a smart gas sensing network platform, and a smart gas object platform interacting in sequence, the smart gas device management platform includes a smart gas device management sub-platform and a smart gas data center, and the smart gas device management platform is configured to perform operations including:

obtaining gas usage data from at least one gas device via the smart gas sensing network platform and sending the gas usage data to the smart gas device management sub-platform by the smart gas data center, and the at least one gas device being configured in the smart gas object platform; and the smart gas device management platform configured to
determine a gas in-home pressure regulation scheme based on current environmental information, and the gas in-home pressure regulation scheme including a pressure regulation parameter of a gas device;

generate, based on the gas in-home pressure regulation scheme, a pressure regulation instruction;

regulate, based on the pressure regulation instruction, a gas in-home pressure of at least one floor; and transmit the gas in-home pressure regulation scheme to a smart gas user terminal, wherein the determining the gas in-home pressure regulation scheme based on current environmental information includes:

obtaining gas information, floor height information, one or more candidate pressure regulation parameters, and a target pressure of the at least one floor;

determining a first expected gas in-home pressure distribution of the at least one floor corresponding to each of the candidate regulation parameters by processing the current environmental information, the gas information, the floor height information and the each of the candidate regulation parameters based on a first prediction model; the first prediction model being a machine learning model;

determining a feasibility of a gas in-home pressure regulation scheme corresponding to the each of the candidate regulation parameters based on the first expected gas in-home pressure distribution and the target pressure of the at least one floor; and determining the gas in-home pressure regulation scheme based on feasibilities of gas in-home pressure regulation schemes corresponding to the one or more candidate regulation parameters, wherein the determining a feasibility of a gas in-home pressure regulation scheme corresponding to the each of the candidate regulation parameters based on the first expected gas in-home pressure distribution and the target pressure of the at least one floor includes:

obtaining in-home standard pressure information;

determining a target pressure interval of the at least one floor by processing the floor height information and the in-home standard pressure information based on a second prediction model; the second prediction model being a machine learning model; and determining the feasibility of the gas in-home pressure regulation scheme corresponding to the each of the candidate pressure regulation parameters by processing the first expected gas in-home pressure distribution of the at least one floor and the target pressure interval of the at least one floor based on an evaluation model; and the evaluation model being a machine learning model.

* * * * *